(12) United States Patent
Kobayashi

(10) Patent No.: US 7,245,298 B2
(45) Date of Patent: Jul. 17, 2007

(54) GAME SYSTEM, IMAGE DRAWING METHOD FOR GAME SYSTEM, AND COMPUTER-READABLE STORAGE MEDIUM STORING GAME PROGRAM

(75) Inventor: Masayuki Kobayashi, Tokyo (JP)

(73) Assignee: Konami Computer Entertainment Japan, Inc., Tokyo (JP)

(*) Notice: Subject to any disclaimer, the term of this patent is extended or adjusted under 35 U.S.C. 154(b) by 0 days.

(21) Appl. No.: 09/816,204

(22) Filed: Mar. 23, 2001

(65) Prior Publication Data

US 2001/0024206 A1  Sep. 27, 2001

(30) Foreign Application Priority Data

Mar. 24, 2000  (JP) .............................. 2000-088603

(51) Int. Cl.
    *G06T 15/00*  (2006.01)
    *G06T 15/40*  (2006.01)
    *G09G 5/00*   (2006.01)

(52) U.S. Cl. ...................... 345/419; 345/421; 345/422; 345/582

(58) Field of Classification Search ................ 345/582, 345/422, 426, 418, 421, 419, 428; 358/462, 358/448, 452; 382/181, 254; 463/31, 44, 463/411, 40, 1–2
See application file for complete search history.

(56) References Cited

U.S. PATENT DOCUMENTS

| | | | |
|---|---|---|---|
| 5,537,224 A * | 7/1996 | Suzuoki et al. ............. | 358/462 |
| 5,949,426 A | 9/1999 | Rich | |
| 6,104,402 A * | 8/2000 | Goddard et al. ............. | 345/419 |
| 6,320,580 B1 * | 11/2001 | Yasui et al. ................. | 345/421 |
| 6,443,842 B1 * | 9/2002 | Totsuka ....................... | 463/31 |
| 6,518,967 B1 * | 2/2003 | Iwasaki ...................... | 345/426 |
| 6,540,614 B1 * | 4/2003 | Nishino et al. ............... | 463/40 |
| 6,587,106 B1 * | 7/2003 | Suzuki et al. ............... | 345/428 |

FOREIGN PATENT DOCUMENTS

| | | |
|---|---|---|
| JP | 10 198819 | 7/1998 |
| WO | WO 98/22911 | 5/1998 |

* cited by examiner

*Primary Examiner*—Jin-Cheng Wang
(74) *Attorney, Agent, or Firm*—Jordan and Hamburg LLP

(57) ABSTRACT

A game system projectively transforms a plurality of polygons, which form three-dimensional object located in an imaginary three-dimensional space, to a viewpoint coordinate system to draw the polygons on a projection plane. The game system includes a polygon drawing unit for drawing a polygon with a first texture which affects drawing of other texture; a second texture drawing unit for drawing a second texture, prepared in advance, on the polygon drawn by the polygon drawing unit based on two-dimensional coordinates of the second texture; and a texture moving unit for simulatively moving the second texture, drawn by the second texture drawing unit, on the polygon drawn by the polygon drawing unit by varying the two-dimensional coordinates in time-series.

6 Claims, 7 Drawing Sheets

GAME SYSTEM, IMAGE DRAWING METHOD FOR GAME SYSTEM, AND COMPUTER-READABLE STORAGE MEDIUM STORING GAME PROGRAM

BACKGROUND OF THE INVENTION

1. Field of the Invention

The present invention relates to a game system which projects and displays polygons having three-dimensional coordinates on a two-dimensional plane.

2. Description of Related Art

Generally, in such a game system, models and characters, which are independent objects to be displayed on a screen, are formed by a plurality of polygons which are two-dimensional imaginary graphic elements of triangular or quadrangular shape. There is known a technique to visually represent specific images of models and characters by putting textures, which are two-dimensional image data, on the polygons. However, since the textures put on the polygons are still images, specific representation or expression is difficult to achieve.

SUMMARY OF THE INVENTION

It is an object of the present invention to provide a game system capable of realizing specific visual representation or expression on polygons displayed on a screen of a game system.

According to one aspect of the present invention, there is provided a game system for projectively transforming a plurality of polygons, which form three-dimensional object located in an imaginary three-dimensional space, to a viewpoint coordinate system to draw the polygons on a projection plane, including: a polygon drawing unit for drawing a polygon with a first texture which affects drawing of other texture; a second texture drawing unit for drawing a second texture, prepared in advance, on the polygon drawn by the polygon drawing unit based on two-dimensional coordinates of the second texture; and a texture moving unit for simulatively moving the second texture, drawn by the second texture drawing unit, on the polygon drawn by the polygon drawing unit by varying the two-dimensional coordinates in time-series.

In accordance with the game system, the polygon with the first texture which affects drawing of other texture is drawn. Then, the second texture, prepared in advance, is drawn on the polygon based on the two-dimensional coordinates thereof. Then, by varying the two-dimensional coordinates of the second texture in time-series, the second texture thus drawn is simulatively moved on the polygon drawn. Therefore, it appears that the image of the second texture is moving, and specific representation may be achieved in association with the first texture.

The two-dimensional coordinates of the second texture may be calculated by transforming three-dimensional coordinates of vertexes of the polygon. Thus, it is unnecessary that the coordinates of the second texture are stored as data for the vertexes of the polygon, and the coordinates of the second texture can be calculated by transforming the coordinates of the vertexes of the polygon. Therefore, data amount to be stored may be reduced.

The two-dimensional coordinates of the second texture may be calculated by projectively transforming three-dimensional coordinates of vertexes of the polygon on an imaginary two-dimensional plane which is prepared in advance and corresponds to the two-dimensional coordinates. Thus, it is unnecessary that the coordinates of the second texture are stored as data for the vertexes of the polygon, and the coordinates of the second texture can be calculated by projectively transforming the coordinates of the vertexes of the polygon on the imaginary two-dimensional plane. Therefore, data amount to be stored may be reduced.

The luminance of colors of the second texture may be different in different areas in the second texture. Thus, the luminance of the colors of the image are varied by moving the second texture, thereby enabling specific visual representation of the polygons with texture.

The luminance of colors of the second texture may vary in proportion to coordinate value in either one direction of the two-dimensional coordinates if the two-dimensional coordinates are fixed. Therefore, by moving the second texture in either one direction of the two-dimensional coordinates, the image having bright color (e.g., lighting portion) and moving in a certain direction may be visually shown.

A part of the second texture may undergo an affect of gradation by the first texture. Therefore, in the area where the gradation is applied, the light of the second texture is shown as moving with slightly leaking out.

The gradation may be executed by mixing the colors of the first texture and the colors of the second texture with a predetermined mixing ratio. Therefore, various gradation may be achieved by controlling the mixing ratio.

According to another aspect of the present invention, there is provided an image drawing method for projectively transforming a plurality of polygons, which form three-dimensional object located in an imaginary three-dimensional space, to a viewpoint coordinate system to draw the polygons on a projection plane, including the steps of: drawing a polygon with a first texture which affects drawing of other texture; drawing a second texture, prepared in advance, on the polygon drawn by the polygon drawing step based on two-dimensional coordinates of the second texture; and simulatively moving the second texture, drawn by the second texture drawing step, on the polygon drawn by the polygon drawing step by varying the two-dimensional coordinates in time-series.

In accordance with this method, the image of the second texture can be shown as moving, and specific visual representation may be achieved in association with the first texture.

According to still another aspect of the present invention, there is provided an image drawing method for projectively transforming a plurality of polygons, which form three-dimensional object located in an imaginary three-dimensional space, to a viewpoint coordinate system to draw the polygons on a projection plane, including the steps of: drawing a polygon with a first texture which affects drawing of other texture; projectively transforming three-dimensional coordinates of vertexes of the polygon on an imaginary two-dimensional plane, prepared in advance, to calculate two-dimensional coordinates of the second texture; drawing the second texture on the drawn polygon based on the calculated two-dimensional coordinates; and simulatively moving the second texture, drawn by the second texture drawing step, on the polygon drawn by the polygon drawing step by varying the two-dimensional coordinates in time-series.

In accordance with this method, the image of the second texture can be shown as moving, and specific visual representation may be achieved in association with the first texture. In addition, it is unnecessary that the coordinates of the second texture are stored as data for the vertexes of the polygon, and the coordinates of the second texture can be calculated by projectively transforming the coordinates of the vertexes of the polygon on the imaginary two-dimensional plane. Therefore, data amount to be stored may be reduced.

According to still another aspect of the present invention, there is provided a computer-readable storage medium carrying a game program for projectively transforming a plurality of polygons, which form three-dimensional object located in an imaginary three-dimensional space, to a viewpoint coordinate system to draw the polygons on a projection plane, the game program controls a computer to function as: a polygon drawing unit for drawing a polygon with a first texture which affects drawing of other texture; a second texture drawing unit for drawing a second texture, prepared in advance, on the polygon drawn by the polygon drawing unit based on two-dimensional coordinates of the second texture; and a texture moving unit for simulatively moving the second texture, drawn by the second texture drawing unit, on the polygon drawn by the polygon drawing unit by varying the two-dimensional coordinates in time-series.

According to still another aspect of the present invention, there is provided a computer-readable storage medium carrying a game program for projectively transforming a plurality of polygons, which form three-dimensional object located in an imaginary three-dimensional space, to a viewpoint coordinate system to draw the polygons on a projection plane, the game program controls a computer to function as: a unit for drawing a polygon with a first texture which affects drawing of other texture; a unit for projectively transforming three-dimensional coordinates of vertexes of the polygon on an imaginary two-dimensional plane, prepared in advance, to calculate two-dimensional coordinates of the second texture; a unit for drawing the second texture on the drawn polygon based on the calculated two-dimensional coordinates; and a unit for simulatively moving the second texture, drawn by the second texture drawing unit, on the polygon drawn by the polygon drawing unit by varying the two-dimensional coordinates in time-series.

By executing the program stored in those storage medium by a computer, the game system according to the present invention may be achieved.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
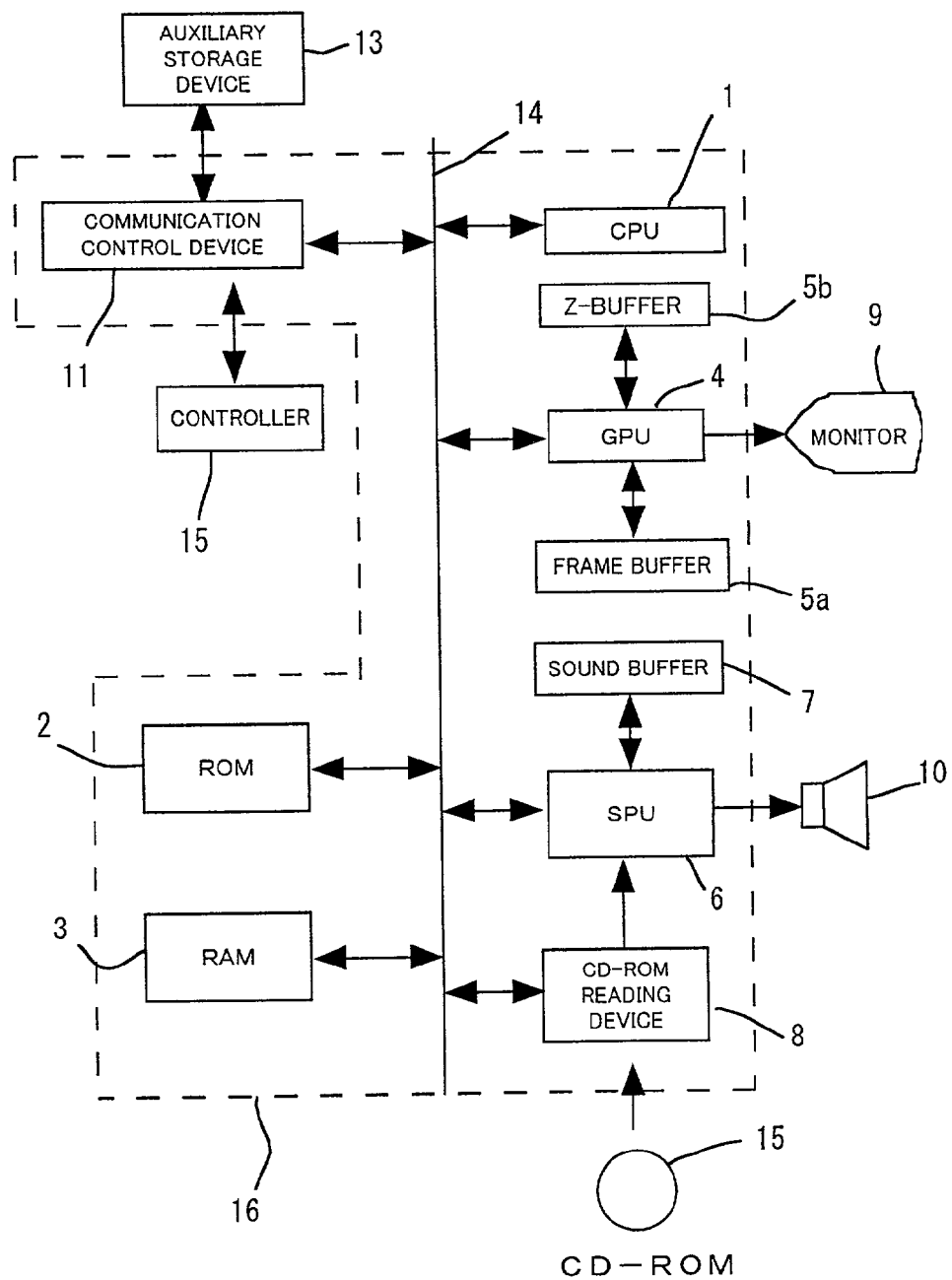
FIG. 1 is a block diagram showing a schematic configuration of a game system according to the present invention.

FIG. 1 is a block diagram showing a control unit of a home-use game system to which the present invention is applied. The home-use game system executes predetermined games according to the game programs recorded on a CD-ROM 15 serving as a storage medium. The game system includes a CPU 1 mainly constituted by a microprocessor, a ROM 2 and a RAM 3 serving as main storage devices for the CPU 1, a graphics processing unit (GPU) for image processing, a frame buffer 5a and a Z-buffer 5b used by the GPU 4, and a CD-ROM reading device 8.

The ROM 2 stores an operation system which is a program necessary for the operational control of the whole game system. The RAM 3 stores game program and image data read out, as needed, from the CD-ROM 15 serving as a storage medium. The image data includes polygon data for a plurality of polygons forming three-dimensional objects arranged in an imaginary three-dimensional space, and texture data to be put or pasted on the polygons to form two-dimensional images. Each polygon data includes information of vertex coordinates $(x_p, y_p, z_p)$, texture coordinates $(u_p, v_p)$ of each vertex, and luminance information. The polygon vertex coordinate z (hereinafter referred to as "Z-value") represents depth of the vertex from the viewpoint of the game-player, and displaying the polygon with small Z-value is effective for opaque polygons. It is noted that "polygon" is a polygonal two-dimensional imaginary graphic element forming objects set in the game space such as models and characters. The GPU 4 receives the polygon data from the CPU 1 and transforms the polygon of local coordinate system $(x_p, y_p, z_p)$ to the data of world coordinate system. Then, the GPU 4 transforms the polygon data of world coordinate system to the data of viewpoint coordinate system $(x_s, y_s, z_s)$ (hereinafter referred to as "screen coordinate system $(x_s, y_s, z_s)$") by applying perspective projection transformation onto the positional coordinate data of the polygons in the world coordinate system. The GPU 4 thus draws the polygons on the frame buffer 5a and the Z-buffer 5b, transforms the drawn image data to a video signal and outputs it to the monitor 9 at appropriate timings. The Z-value is written onto the Z-buffer 5b. In drawing the polygons on the frame buffer 5a and the Z-buffer 5b, processing necessary for drawing, such as size variation corresponding to distance, texture mapping and lighting, are executed. The "local coordinate system" is a coordinate system peculiar to each polygon, and moves if the polygon moves. The "world coordinate system" is fixed even if the polygon moves. The "screen coordinate system" represents the position on the screen where the polygon is eventually displayed.

The texture put or pasted on the polygon by the texture mapping is determined based on the texture coordinate $(u_p, v_p)$ of each vertex. The texture has RGB channels (three primitive colors), and the design of the texture and optical density of the color are determined by the setting of the RGB channels. The texture also has A-(alpha) channel, by which the texture can be set to be transparent and the permissibility of drawing other (i.e., second) texture over the (first) texture can be set (such setting can be made by the texture area unit). For example, if the A-(alpha) channel is set such that the drawing of other texture is permitted, the design or pattern of second texture is displayed in the area where the second texture overlaps the first texture. Conversely, if the A-(alpha) channel is set such that the drawing is not permitted (i.e., inhibited), drawing the second texture is inhibited in the area where the second texture overlaps the first texture, and the design or pattern of the first texture is displayed. Further, in the A (alpha) channel, an intermediate levels between the drawing permitted level and the drawing inhibited level may be set. In other words, gradation may be set. By this, it is possible to express such a state that the light of second texture is slightly mixed into the first texture (not so completely like the drawing permitted area, but dimly visible). For example, assuming that the alpha value of a certain pixel is set to A1 and RGB values of the pixel are set to R1, R2 and R3, respectively, and that RGB values of another pixel are set to R2, G2 and B2, respectively, the colors (R,G,B) displayed on the screen are expressed as: R=R1+A1×R2, G=G1+A1×G2, B=B1+A1×B2. The alpha value A1 represents the mixing ratio of the first texture and the second texture, and the drawing the first texture is completely inhibited if A1=0. Namely, based on the value A1, the optical density of the second texture is determined. This is called "alpha blending" utilizing destination alpha.

The game system shown in FIG. 1 further includes a sound processing unit (SPU) 6 and a sound buffer 7. The SPU 6 reproduces voice and/or sound data and music source data read out from the CD-ROM 15 and stored in the sound buffer 7, and outputs the sound from the speaker 10. The CD-ROM reading device 8 reads out program and/or data recorded on the CD-ROM 15 in accordance with the instruction from the CPU 1, and outputs a signal corresponding to the contents thus read out. On the CD-ROM 15, program and data necessary for the execution of the game are recorded. A home-use television receiver may be used as the monitor 9.

Further, the communication control device 11 is connected to the CPU 1 via the bus 14, and the controller 12 and the auxiliary storage device 13 are detachably connected to the communication control device 11. The controller 12 functions as an input device, on which manipulation members to be manipulated by the game-player are provided. The communication control device 11 repeatedly scans the manipulation state of the controller 12 with a predetermined interval, and outputs the signal corresponding to the scanning result to the CPU 1. The CPU 1 judges the manipulation state of the controller 12 based on the signal from the controller 12. In the above arrangement, the components other than the monitor 9, the speaker 10, the controller 12, the CD-ROM 15 and the auxiliary storage device 13 are integrally accommodated in a single housing which constitutes the body unit 16 of the game system.

In the above-described game system, the game program recorded on the CD-ROM 15 is loaded to the RAM 3 and executed by the CPU 1, and thus the game-player may play game of various genre on the screen of the monitor 9. According to this embodiment, the game is an action game, and program necessary for executing the action game by the game system as well as image data corresponding to the various scenes appearing in the action game are recorded on the CD-ROM 15. In the action game of the embodiment, the character controlled by the game-player moves here and there in the imaginary three-dimensional space drawn on the monitor 9 and manipulates weapons such as guns to fight against enemy characters.

Figure 2:
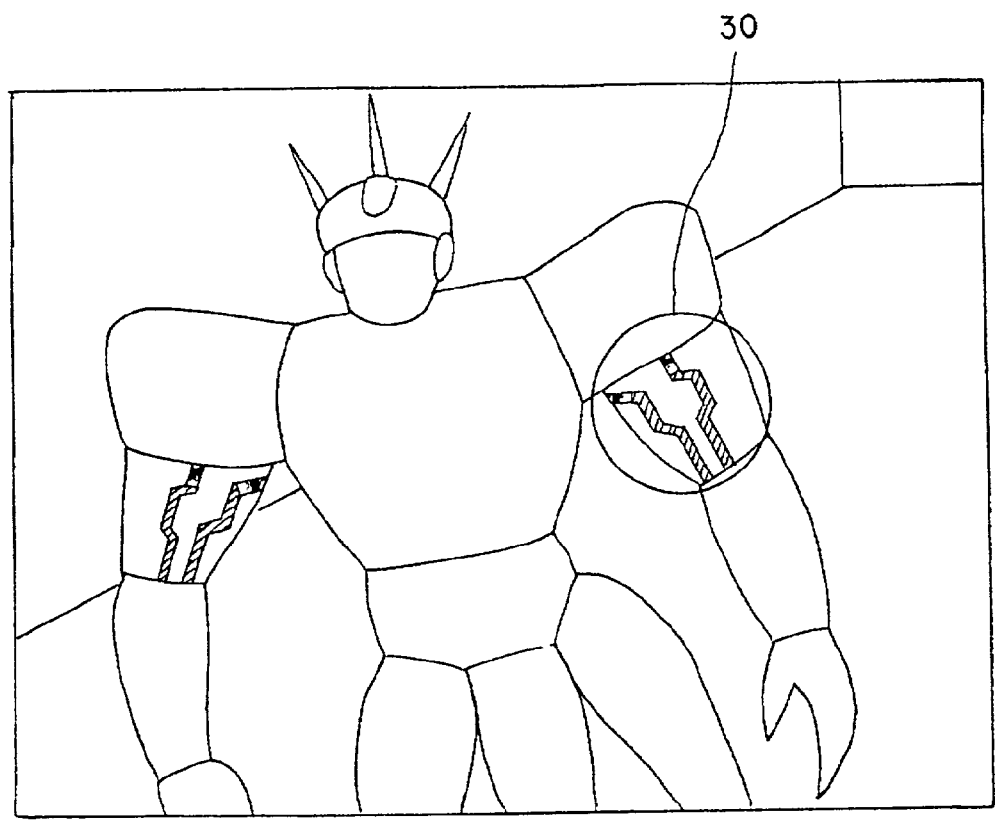
FIG. 2 is a diagram showing an example of image of a character displayed on a screen.
Figure 3:
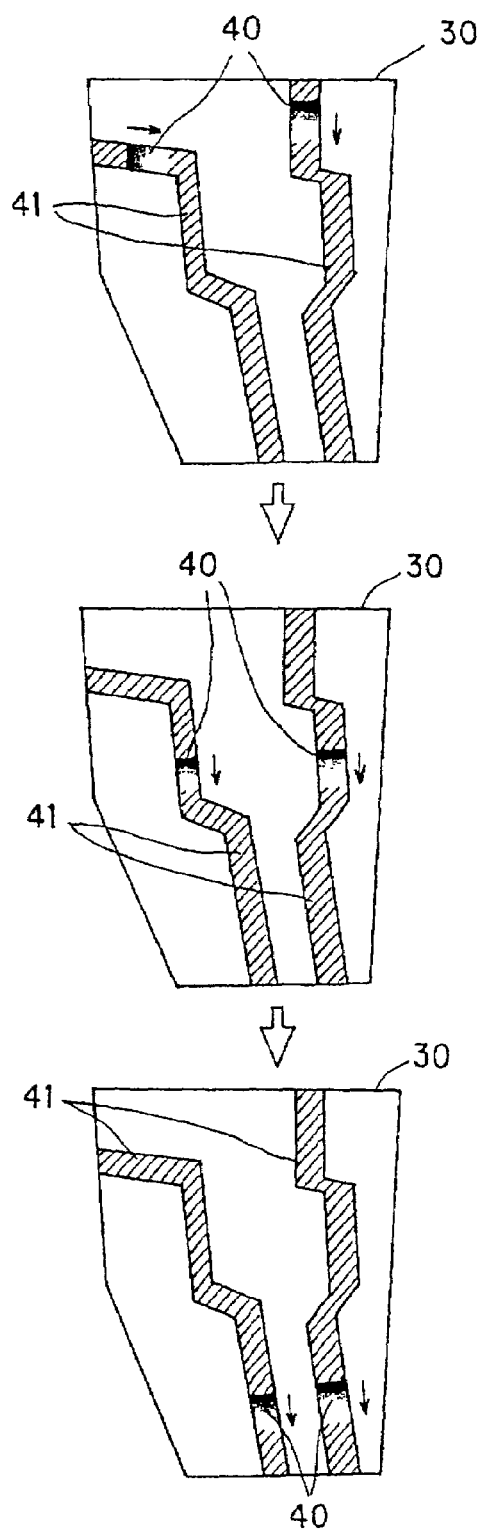
FIG. 3 is a magnified view of an arm portion of the character shown in FIG. 2, wherein lighting portions are moving.

FIG. 2 shows an example of image of a character displayed on the monitor 9. The character shown in FIG. 2 is a three-dimensional object formed by a plurality of polygons. FIG. 3 shows the magnified view of the arm portion 30 of the character shown in FIG. 2. As shown in FIG. 3, the light movement lines 41 are formed on the surface of the arm portion 30, and the lighting portion 40 moves on the light movement lines 41 in the direction of the arrows. This is realized by varying the texture coordinate put (drawn) on the polygons of the arm portion 30 in order.

Figure 4:
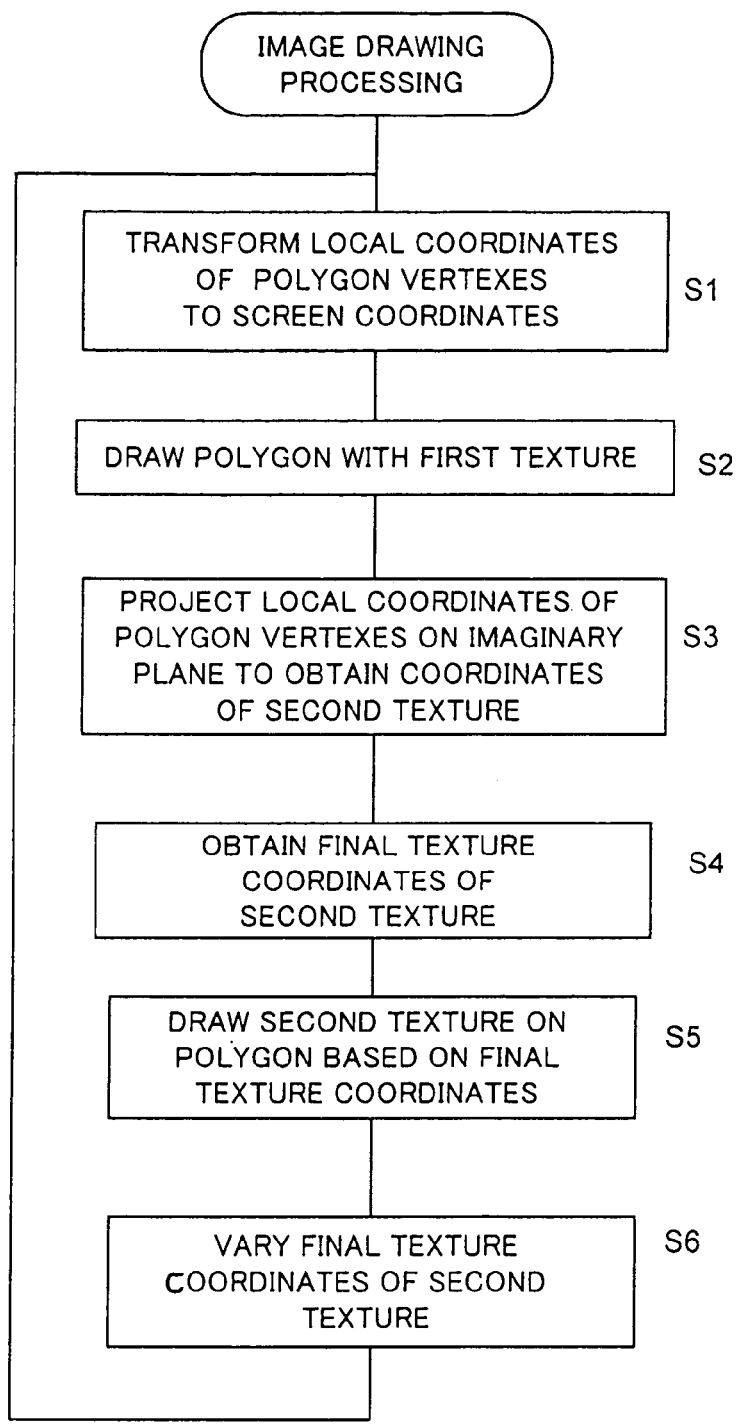
FIG. 4 is a flowchart showing image drawing process executed by the game system according to the present invention.

The operation of the game system for displaying such image will be described with reference to the flowchart of FIG. 4 and explanatory diagrams of FIGS. 5 to 9. According to the progress of the game program, the CPU 1 reads out the polygon data stored in the RAM 4, and transforms the local coordinates $(x_p, y_p, z_p)$ of the vertexes of the polygons to the world coordinates and then to the screen coordinates $(x_s, y_s, z_s)$ in step S1. Then, based on the texture coordinates $(u_p, v_p)$ that the polygons have, the RGB channels and the A-(alpha) channel of the first texture are written on the frame buffer 5a (step S2). By this, the polygons with the first textures are displayed on the screen. By simultaneously writing the RGB channels and the A-(alpha) channel on the frame buffer 5a, the calculation amount may be reduced. For the first texture, the drawing permitted area for other texture and gradation area are set in the A-channel, and these data are written onto the A-channel area of the frame buffer 5a and the Z-buffer 5b. Thus, the object formed by a plurality of polygons is displayed on the screen of the monitor 9.

Figure 5:
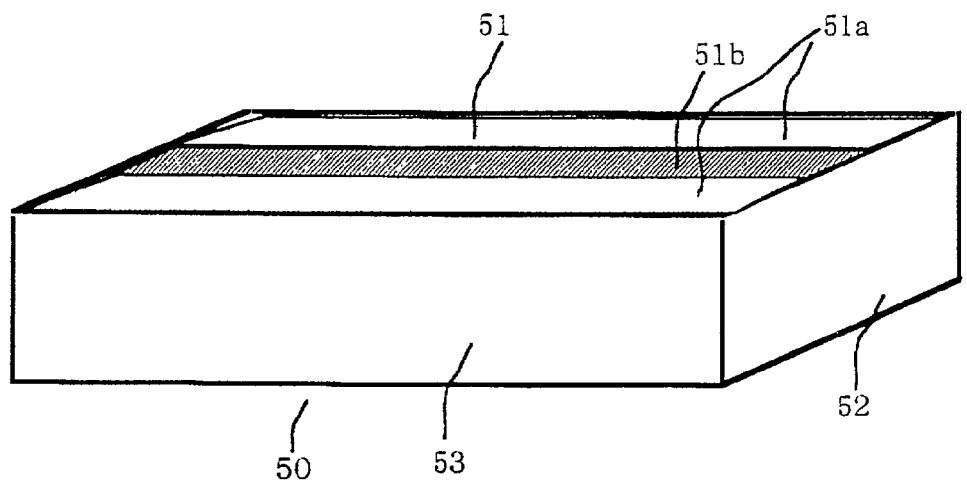
FIG. 5 shows an object of the arm portion of the character shown on the screen.

FIG. 5 shows the object 50 of the arm portion 30 shown on the screen of the monitor 9. The object 50 of the arm portion is formed by the polygons 51, 52 and 53. Out of them, the portions 51a of the polygon 51 are gradation areas where gradation with other texture is made. The portion denoted by the reference number 51b is a drawing permitted area for other texture, and corresponds to the light movement line 41 in FIG. 2.

Figure 6:
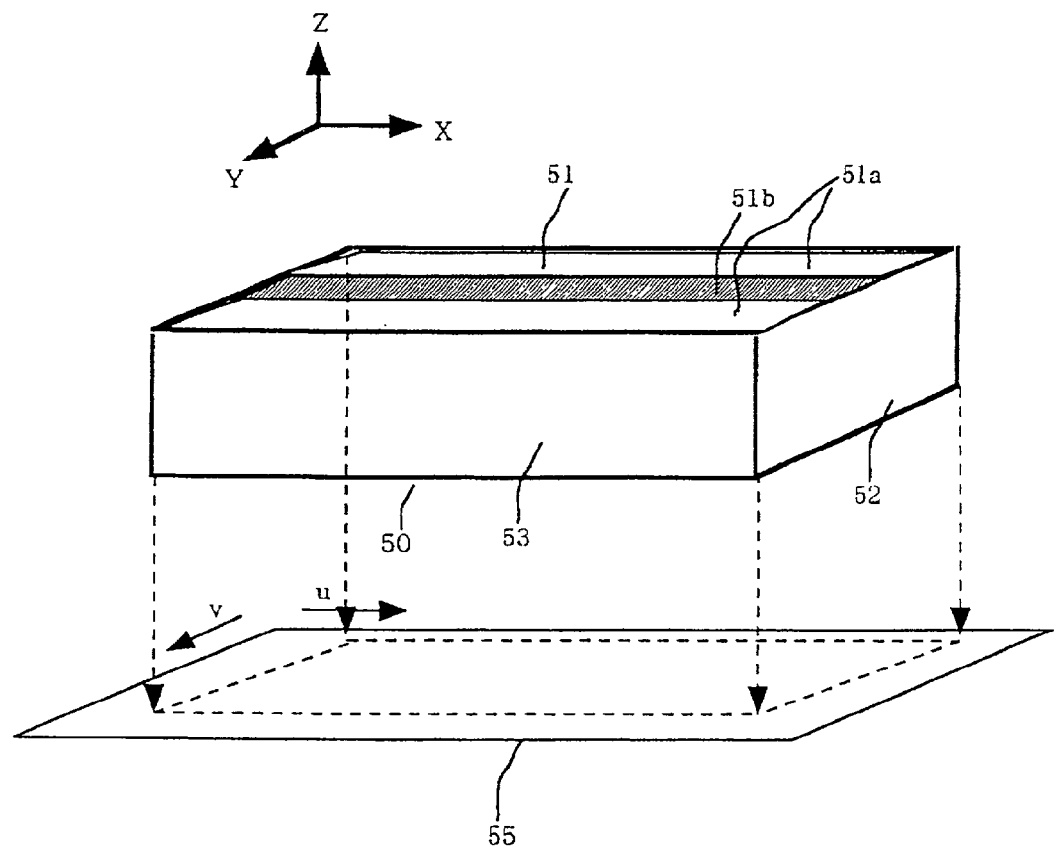
FIG. 6 is an explanatory view showing the manner that a polygon is projected onto a predefined imaginary plane.

Subsequently, the local coordinates $(x_p, y_p, z_p)$ of the vertexes of the polygons drawn in step S1 are projected onto a predefined imaginary plane (e.g., an imaginary parallelogram plane) 55 as shown in FIG. 6 to calculate the second texture coordinate (u, v) (step S3). The texture coordinate (u, v) obtained by such projection may be calculated by the following predetermined equation, for example:

$$\begin{pmatrix} u \\ v \end{pmatrix} = \begin{pmatrix} \frac{u_{bx}}{|\overline{u_b}|^2} & \frac{u_{by}}{|\overline{u_b}|^2} & \frac{u_{bz}}{|\overline{u_b}|^2} \\ \frac{v_{bx}}{|\overline{v_b}|^2} & \frac{v_{by}}{|\overline{v_b}|^2} & \frac{v_{bz}}{|\overline{v_b}|^2} \end{pmatrix} \begin{pmatrix} x_p - P_x \\ y_p - P_y \\ z_p - P_z \end{pmatrix}$$

Here, $P_x$, $P_y$ and $P_z$ are reference position vectors determining the position on which the second texture is to be put or pasted. The $u_{bx}$, $u_{by}$ and $u_{bz}$ are u-direction reference vectors with respect to the reference position vector, and the $v_{bx}$, $v_{by}$ and $v_{bz}$ are v-direction reference vectors with respect to the reference position vector. Thus, it is unnecessary to store texture coordinates of the second texture as the data for each vertexes of polygons, but they can be generated by projecting the polygon coordinates according to the above equation. This enables reduction of data amount to be stored. In addition, since the imaginary plane 55 can be used in common for a plurality of polygons, the data amount may be reduced in comparison with the case where each polygon has an imaginary plane. Further, the second texture may be properly drawn even if the texture covers plural polygons.

Next, dynamically changing value (u', v') is added to the texture coordinates (u, v) obtained in step S3 to calculate the final second texture coordinates (u1, v1) (step S4). Namely, the calculation: (u1, v1)=(u, v)+(u', v') is executed. Here, the value (u', v') is being set as (u', v')=(0, 0), for example, at the initial setting stage.

Next, the second texture is read out from the RAM 4 and is drawn on the first texture of the polygon 51 with alpha-blending based on the final second texture coordinate (u1, v1) and the screen coordinate ($x_s$, $y_s$, $z_s$) of the polygon 51 transformed in step S1 (step S5). Thus, the screen coordinates ($x_s$, $y_s$, $z_s$) of the polygon 51 transformed in step S1 may be used in drawing the second texture thereby to reduce the calculation amount.

Figure 7:
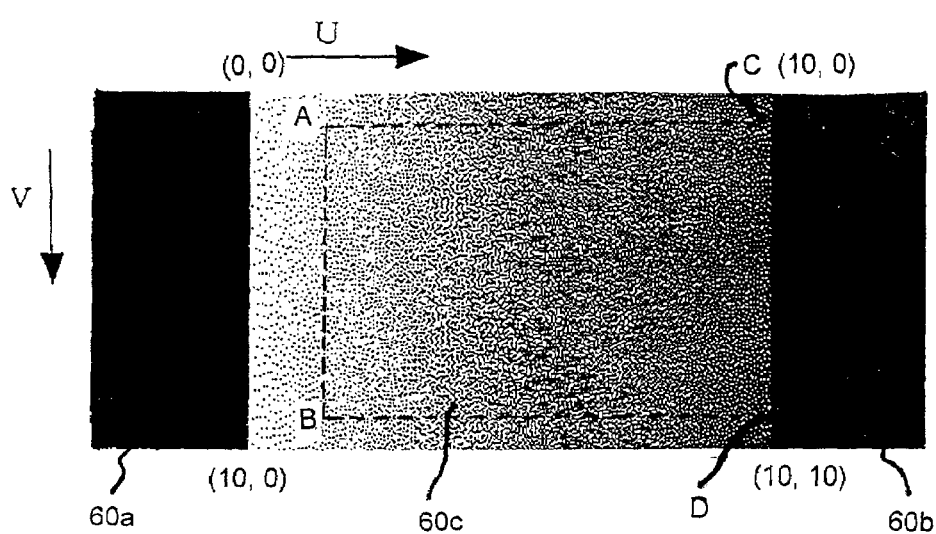
FIG. 7 shows an example of texture.

FIG. 7 shows an example of the texture 60 read out at this time. As seen in FIG. 7, the second texture 60 has their own coordinates and corresponds to the coordinate position of the imaginary plane 55. In the example of FIG. 7, as the value u in the u-direction increases, the optical density of the color increases. The colors of the area 60a and 60b are set to be black. The coordinate position of the second texture 60 drawn on the first texture of the polygon 51 is determined, by the texture coordinate (u1, v1) of the final second texture, as the four corners (A, B, C, D) of the area 60c shown in FIG. 7.

Figure 8:
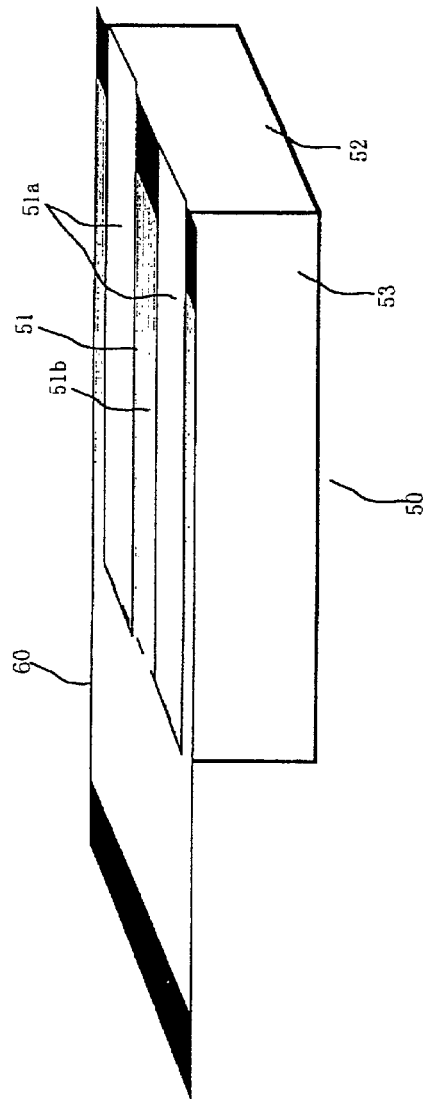
FIG. 8 shows a manner the texture is put or pasted onto the polygon.

FIG. 8 shows the state when the second texture 60 is put or pasted on the polygon 51. In the example of FIG. 8, the texture put or pasted has an area larger than that of the polygon 51, but the area of the texture 60 overlapping the polygon 51 is actually displayed on the screen of the monitor 9. As shown in FIG. 8, the gradation area 51a is shown in such a manner that the light of the image of the second texture 60 is slightly mixed. In the drawing permitted area 51b, the image of the second texture 60 is displayed. The gradation area 51a may be set in such a manner that the aforementioned alpha value decreases as the distance from the drawing permitted area 51b increases. By this, as the distance from the drawing permitted area 51b increases, the image is shown in such a manner that the light of the image of the second texture 60 is gradually reduced.

Figure 9:
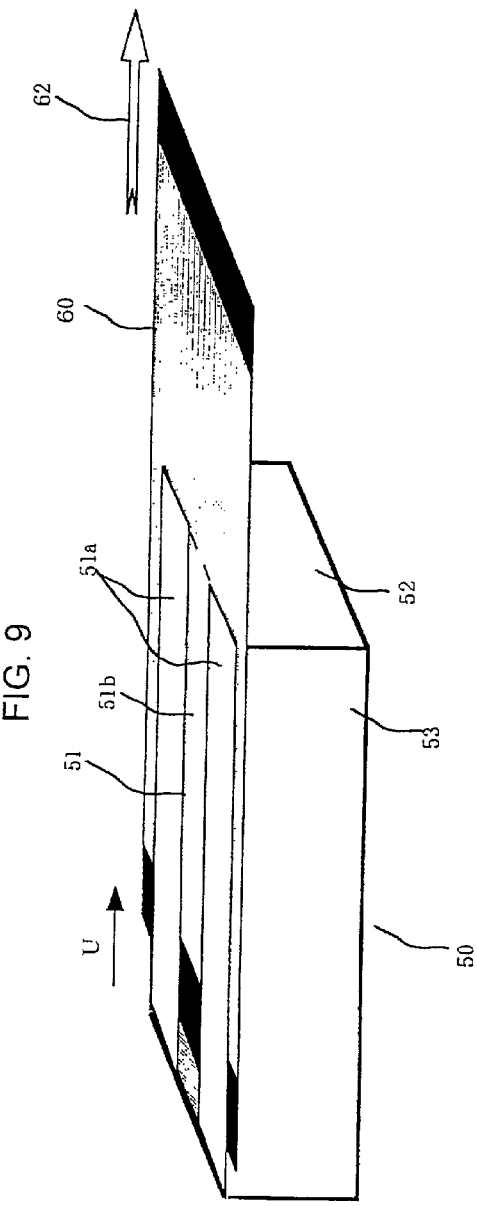
FIG. 9 shows the manner the texture put or pasted on the polygon moves.

Next, the value (u', v') of the coordinate of the second texture 60 is varied (step S6). Namely, for the subsequent drawing, the texture coordinate (u1, v1) is moved. Then, the process returns to step S1 for the next frame to execute the same processing, thereby the second texture is drawn based on the coordinate (u1, v1) of the second texture after the value (u', v') is varied. Then, by varying the value (u', v') in each frame, in order, the design or pattern of the second texture may be displayed as if it is moving. For example, by varying the value u' from 0 to 10 stepwise in each frame, the texture 60 may be displayed as if it is moving on the polygon 51 in the u-direction as seen in FIG. 9. Further, since the color is getting denser as the value u in the u-direction increases as shown in FIG. 7, image can be displayed as if the lighting portion 40 is moving along the light movement line 41 (51b in FIG. 9) as shown in FIG. 3 and the light of the lighting portion 40 is moving in the gradation areas 51a with slightly leaking out.

In this way, by controlling the value (u', v'), the lighting portion 40 can be moved on the polygons forming the character. While only the value u' is varied in the above description, both of the values u' and v' may be varied.

While the above described embodiment is directed to the movement of the lighting portion on the surface of the character's arm portion 30, the application of the invention is not limited to such case, and liquid, for example, may be moved. Further, by the appropriate combination of the color of the texture 60, the setting of the pattern and the setting of the mask area 51 on the polygon 51a, various expression may be achieved on the screen of the monitor 9. The present invention is applicable to the games of any genre, such as role-playing game, simulation game and action game.

As described above, according to the present invention, the texture put or pasted on the polygons displayed on the game screen may be moved by the coordinate transformation, and this enables specific representation or expression on the polygons. Further, by specifically setting the area on a part of the polygon where putting or pasting the texture is inhibited, more complicated representation or expression may be realized on the polygons.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-088603 filed on Mar. 24, 2000 including the specification, claims, drawings and summary is incorporated herein by reference in its entirety.

What is claimed is:

1. A game system for projectively transforming a plurality of polygons, which form a three-dimensional object located in an imaginary three-dimensional space, to a viewpoint coordinate system to draw the polygons on a projection plane of a display, comprising:

a polygon drawing means for drawing a polygon of the three-dimensional object and displaying the polygon in a frame image presented on the display, the polygon having a first texture representative of a surface of the three-dimensional object and imposed on the polygon of the three-dimensional object, said first texture including a mixing ratio of the first texture which affects drawing of a second texture onto the first texture so as to determine a mixing of the first texture and the second texture, wherein the second texture is also representative of the surface of the three-dimensional object;

a calculating means for calculating two-dimensional coordinates of the second texture, which is a still image texture prepared in advance, by projectively transforming three-dimensional coordinates of vertexes of the polygon of the three-dimensional object, drawn by the polygon drawing means, onto an imaginary two-dimensional plane which is prepared in advance and corresponds to two-dimensional coordinates of the second texture to produce two-dimensional vertex coordinates of the second texture which correspond to projections of the three-dimensional coordinates of the vertexes of the polygon of the three-dimensional object;

a second texture drawing means for drawing the second texture on the polygon displayed of the three-dimensional object, the drawing of the second texture being effected using the two-dimensional vertex coordinates of the second texture calculated by the calculating means to determine a portion of the second texture drawn on the polygon, wherein the first texture and the second texture are mixed to effect transparency based on said mixing ratio of said first texture to effect the drawing of the second texture onto the first texture; and a texture moving means for moving in the display the second texture, drawn by the second texture drawing means, on the polygon of the three-dimensional object drawn by the polygon drawing means and displayed in the display, the moving being effected by successively varying two-dimensional vertex coordinates of the portion of the second texture used by the second texture drawing means in time-series relative to the two-dimensional vertex coordinates of the second texture previously calculated by projectively transforming the three-dimensional coordinates of vertexes of the polygon, so that the second texture appears as an image moving relative to the polygon when displayed.

2. The game system according to claim 1, wherein luminance of colors of die second texture are different in different areas. in the second texture.

3. The game system according to claim 1, wherein luminance of colors of the second texture vary in proportion to coordinate value in either one direction of the two-dimensional coordinates if the two-dimensional coordinates are fixed.

4. The game system according to claim 1, wherein a pan of the first texture undergoes an affect of gradation by the second texture resulting from the first texture and second texture being mixed.

5. An image drawing method for projectively transforming a plurality of polygons, which form a three-dimensional object located in an imaginary three-dimensional space, to a viewpoint coordinate system to draw the polygons on a projection plane of a display, comprising the steps of:

drawing a polygon of the three-dimensional object and displaying the polygon in a frame image presented on the display. the polygon having a first texture representative of a surface of the three-dimensional object and imposed on the polygon of the three-dimensional object, said first texture including a mixing ratio of the first texture which affects drawing of a second texture onto the first texture so as to determine a mixing of the first texture and the second texture, wherein the second texture also representative of the surface of the three-dimensional object;

calculating two-dimensional coordinates of the second texture, which is a still image texture prepared in advance, by projectively transforming three-dimensional coordinates of vertexes of the polygon of the three-dimensional object, drawn by the polygon drawing step, onto an imaginary two-dimensional plane which is prepared in advance and corresponds to two-dimensional coordinates of the second texture to produce two-dimensional vertex coordinates of the second texture which correspond to projections of the three-dimensional coordinates of the vertexes of the polygon of the three-dimensional object;

drawing the second texture on the polygon displayed of the three-dimensional object, the drawing of the second texture being effected using the two-dimensional vertex coordinates of the second texture calculated by the calculating step to determine a portion of the second texture drawn on the polygon, wherein the first texture and the second texture are mixed to effect transparency based on said mixing ratio of said first texture to effect the drawing of the second texture onto the first texture; and moving in the display the second texture, drawn by the second texture drawing step, on the polygon of the three-dimensional object drawn by the polygon drawing step and displayed in the display, the moving being effected by successively varying two-dimensional vertex coordinates of the portion of the second texture used by the second texture drawing step in time-series relative to the two-dimensional vertex coordinates of the second texture previously calculated by projectively transforming the three-dimensional coordinates of vertexes or the polygon, so that the second texture appears as an image moving relative to the polygon when displayed.

6. A computer-readable storage medium carrying an executable game program for projectively transforming a plurality of polygons, which form a three-dimensional object located in an imaginary three-dimensional space, to a viewpoint coordinate system to draw the polygons on a projection plane of a display, the executable game program being comprised to configure a computer to function as:

a polygon drawing means for drawing a polygon of the three-dimensional object and displaying the polygon in a frame image presented on the display. the polygon having a first texture representative of a surface of the three-dimensional object and imposed on the polygon of the three-dimensional object, said first texture including a mixing ratio of the first texture which affects drawing of a second texture onto the first texture so as to determine a mixing of the first texture and the second texture, wherein the second texture is also representative of the surface of the three-dimensional object;

a calculating means for calculating two-dimensional coordinates of the second texture, which is a still image texture prepared in advance, by projectively transforming three-dimensional coordinates of vertexes of the polygon of the three-dimensional object, drawn by the polygon drawing means, onto an imaginary two-dimensional plane which is prepared in advance and corresponds to two-dimensional coordinates of the second texture to produce two-dimensional vertex coordinates of the second texture which correspond to projections of the three-dimensional coordinates of the vertexes of the polygon of the three-dimensional object;

a second texture drawing means for drawing the second texture on the polygon displayed of the three-dimensional object, the drawing of the second texture being effected using the two-dimensional vertex coordinates of the second texture calculated by the calculating means to determine a portion of the second texture drawn on the polygon. wherein the first texture and the second texture are mixed to effect transparency based on said mixing ratio of said first texture to effect the drawing of the second texture onto the first texture; and a texture moving means for moving in the display the second texture, drawn by the second texture drawing means, on the polygon of the three-dimensional object drawn by the polygon drawing means and displayed in the display, the moving being effected by successively varying two-dimensional vertex coordinates of the portion of the second texture used by the second texture drawing means in time-series relative to the two-dimensional vertex coordinates of the second texture previously calculated by projections transforming the three-dimensional coordinates of vertexes of the polygon, so that the second texture appears as an image moving relative to the polygon when displayed.

* * * * *